Dec. 30, 1924.
G. CORIGLIANO
1,521,078
METHOD OF CURING TREES OF GUM DISEASES
Filed Jan. 23, 1923
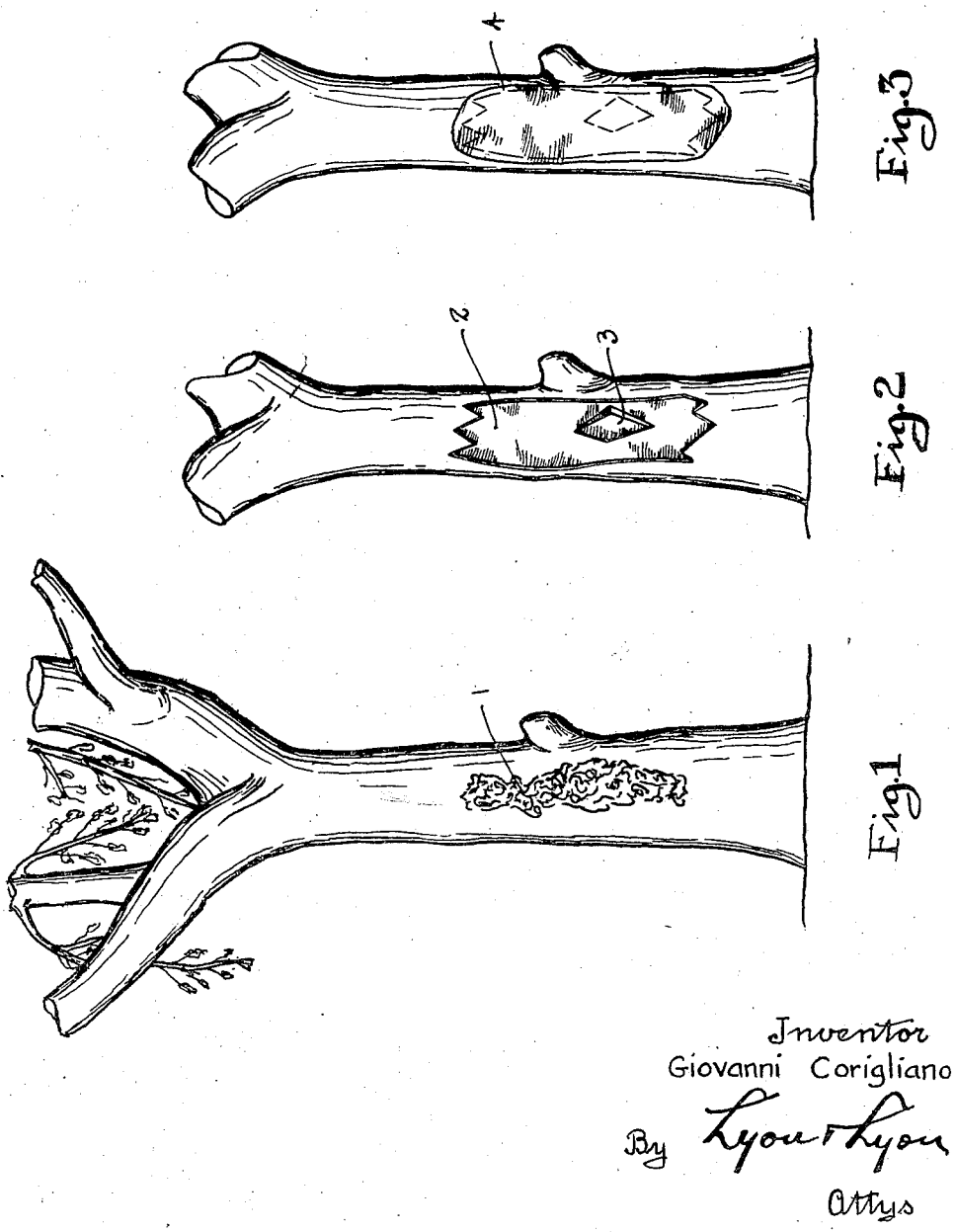
Inventor
Giovanni Corigliano
By Lyon&Lyon
Attys Patented Dec. 30, 1924.

1,521,078

UNITED STATES PATENT OFFICE.

GIOVANNI CORIGLIANO, OF MONROVIA, CALIFORNIA.

METHOD OF CURING TREES OF GUM DISEASES.

Application filed January 23, 1923. Serial No. 614,349.

*To all whom it may concern:*

Be it known that I, GIOVANNI CORIGLIANO, a citizen of the United States, residing at Monrovia, in the county of Los Angeles and State of California, have invented a new and useful Method of Curing Trees of Gum Diseases, of which the following is a specification.

This invention relates to a compound and method adapted for controlling and curing certain gum diseases which affect the bark of trees, and while not limited thereto, is specifically effective in curing gummosis, a gum disease which infects citrus trees.

Hitherto, the methods employed in controlling gum diseases infecting trees, such as gummosis, are effective only in segregating the disease and controlling the spread of it so that the infection will not spread over the entire tree, and have been of little avail in actually curing the infected region itself, and cannot be employed, upon a tree in which the infection has spread so that the entire circumference of the tree is infected by disease.

An object of this invention is to provide a method and compound which will cure the regions of the trees infected by gum disease and permit a growing of a new unaffected bark thereover, thus restoring to the tree its full original healthy condition.

Another object of this invention is to provide a method and compound whereby a tree may be cured of gum diseases even when the gum disease has proceeded to a very advanced state, wherein it infects practically the entire tree trunk.

Another object of this invention is to provide a simple and inexpensive method and compound, whereby gum diseases may be cured.

Various other advantages and objects of this invention can be more fully understood from a description of the gum curing compound, method of producing the same, and a description of the accompanying drawings, which illustrate the preferred manner of curing gum diseases and particularly refers to a manner of curing an infection of gummosis in citrus trees.

In the drawings:

Fig. 1 illustrates roughly, the appearance of a tree partially infected by gummosis.

Fig. 2 illustrates the manner of cutting off the infected bark regions of the tree.

Fig. 3 illustrates the tree covered with a cure compound.

In the preferred process, as applied to curing gummosis, the outer bark of the infected region, as indicated by 1, is cut away leaving the inner part disclosed as illustrated at 2. Preferably the bark should be cut away a slight distance beyond any invisible infection of the bark. The cut-away region may then be covered by a coating of material designed to kill the gummosis and permit the inner bark to grow over the cut-away portion. I find it preferable, however, to first permit the tree to stand for twenty-four or forty-eight hours to indicate whether any of the inner bark portions still remain infected. In the warmer weather, the 24-hour period is sufficient to bring out a discoloring, which discloses infection in the inner bark; in the colder weather, somewhat longer time is necessary. If any of the inner bark has been infected, this also should be cut away as indicated by a deeper cut 3. Thereafter, the covering material is placed over the cut-away bark. The nature of such covering material, and manner of producing the same will be hereafter described. The covering material adheres to the tree and permits the under bark to grow out and properly form over the cut away portion while the covering material acts to kill the disease. In two or three years the bark will be found to have fully grown over any of the infected regions, except such portions as are indicated at 3 in the drawings, wherein it was found necessary to cut into the second bark. Such regions, however, are normally quite small, since the disease is principally limited to the outer bark. In case the infection has so spread as to cover a large part of the tree trunk, and entirely surround the trunk, it is necessary to cure the infection in sections, since the cutting away of the entire outer bark of the tree at one time would undoubtedly kill the tree. In this case, I find it desirable to cut away the bark of the tree about one-third around the trunk and wait until the under bark has somewhat grown out before operating upon the other infected regions.

Various materials may be used to cover the infected region, it being desirable to prevent the access of air to the exposed inner bark and to have a material poisonous to the organism causing the infection held firmly and permanently over the cut so that the gum disease cannot infect the new growth under the covering. For this purpose I employ an insecticide such as sulphur, which is mixed with an oil and wax to form an adhesive coating impregnable to air. While various other materials may be substituted therefor, I prefer to employ a mixture of castor oil and bees wax to which has been mixed a quantity of sulphur. As an example of the proportion of these ingredients found desirable, in preparing three pounds of the compound, I use one and seven-eighths (1⅞) pounds of oil, seven-eighths (⅞) of a pound of bees wax, and one-fourth (¼) of a pound of sulphur. The oil tends to hold or dissolve the sulphur in the compound, and the bees wax produces a stiffening whereby the mixture will not run from the tree, but properly adhere thereto.

The bees wax and oil are first added and thoroughly mixed together by heating the mixture to about 300° F., whereafter the mixture is permitted to cool to about 200° F., after which the sulphur is thoroughly mixed in. For reasons not thoroughly understood, the best results are obtained if the mixture is not permitted to greatly exceed 200° F., after the addition of sulphur.

The compound is opaque and solid in appearance and in applying it to the tree, it is first heated to about 200° F.; thereafter it is painted over the regions, taking care that the covering extends well over the cut away portion, as illustrated at 4 in Fig. 3.

It is understood that the compound and process herein described, while highly suited for the purposes of my invention, may be somewhat modified, according to the use to which it is put and my invention is therefore not limited to the precise materials used nor manner of applying the same, but is of the scope set forth in the following claim.

I claim:

In a method of curing trees infected by gum diseases, the combination of operations consisting in first cutting away the outer bark infected by the disease, exposing the under bark for a period of time to permit detection of any infection thereof, cutting away such under bark infected regions and covering the cut away portions of the trees with an under bark protecting substance.

Signed at Los Angeles, California, this 16th day of January, 1923.

GIOVANNI CORIGLIANO